Jan. 9, 1923.
R. M. GASTON.
METHOD OF AND MEANS FOR TESTING THE QUALITY AND CONDITION OF SOLID SUBSTANCES.
FILED FEB. 8, 1918.
1,441,626.
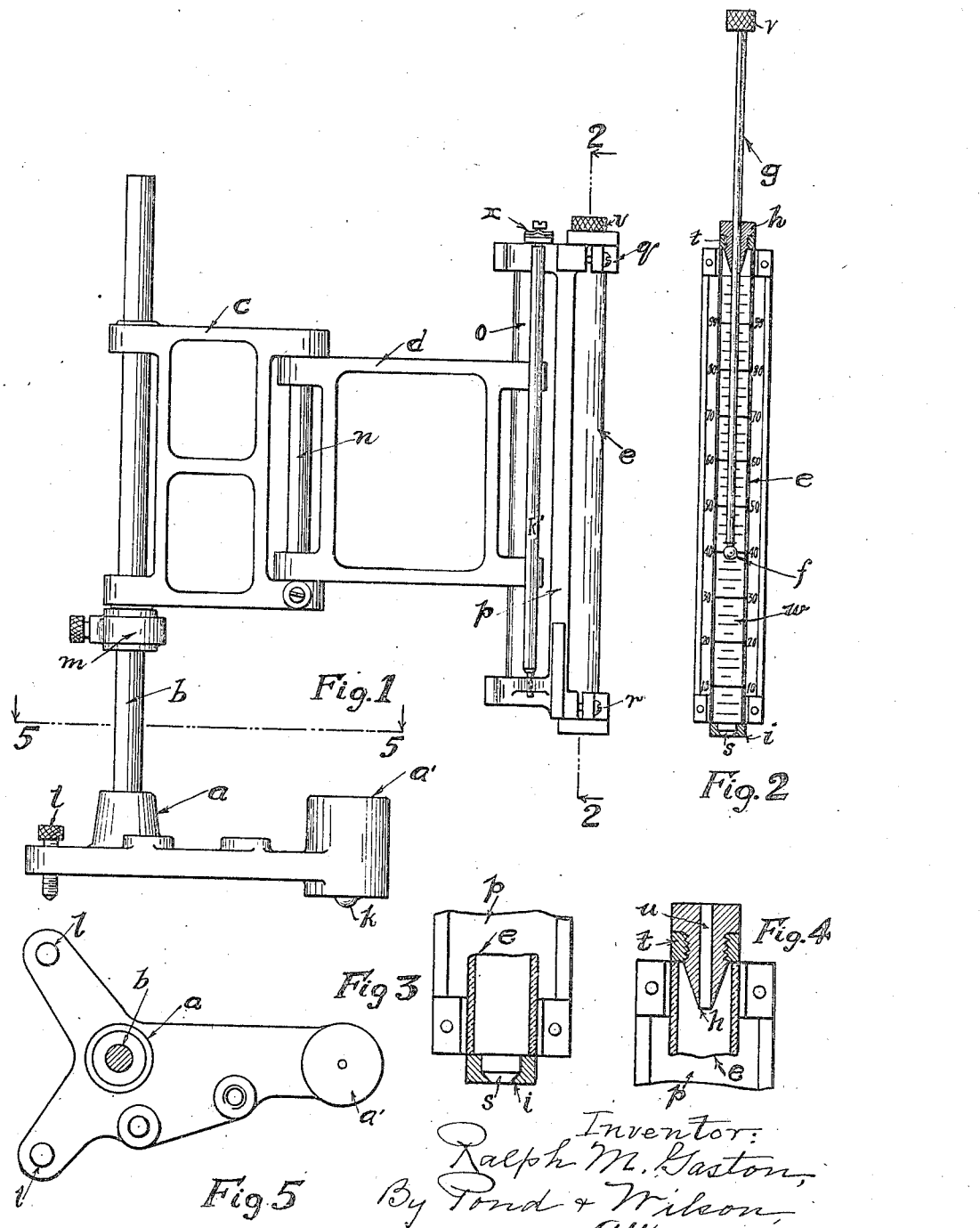
Inventor:
Ralph M. Gaston,
By Pond & Wilson,
Attys.

Patented Jan. 9, 1923.

1,441,626

UNITED STATES PATENT OFFICE.

RALPH M. GASTON, OF CHICAGO, ILLINOIS.

METHOD OF AND MEANS FOR TESTING THE QUALITY AND CONDITION OF SOLID SUBSTANCES.

Application filed February 8, 1918. Serial No. 215,949.

*To all whom it may concern:*

Be it known that I, RALPH M. GASTON, a citizen of the United States, residing at Chicago, in the county of Cook and State of Illinois, have invented certain new and useful Improvements in Methods of and Means for Testing the Quality and Condition of Solid Substances, of which the following is a specification.

This invention relates to a new method of and means for testing the quality and condition of solid substances, such as metals, rubber and insulation compounds, by a determination of their relative resilience as measured by the extent of rebound of an elastic striker impinging thereon.

Among the objects of the present invention are, to produce an instrument that shall combine simplicity of structure and mode of manipulation with accuracy and reliability of results, to produce an instrument readily adaptable to varying sizes and shapes of test material, to produce an instrument which shall eliminate practically all factors and conditions tending to produce error, and to produce a method of and instrumentality for performing simple and inexpensive tests of materials which will predetermine their ability to meet service conditions.

To these and other ends, which will be apparent to those skilled in the art from the following description, the invention consists in the matters hereinafter described and more particularly pointed out in the claims hereunto appended. Generally stated, the invention in its broadest physical embodiment consists of an instrument wherein the quality and condition of solid substances are tested by a comparison of the heights of rebound of a round ball or sphere dropped a uniform distance onto the test specimens. In order that the invention may be fully and clearly understood both as to its method or principle of operation and as to the essential features of its physical structure, I have illustrated in the accompanying drawing one simple and practical form of instrument in which the invention may be expressed, and which I have found by repeated tests to afford accurate and reliable results.

Referring to the drawing:—

Fig. 1 is a side elevation of the complete instrument.

Fig. 2 is an axial vertical section substantially on the line 2—2 of Fig. 1.

Fig. 3 is an enlarged vertical section through the lower portion of the scale tube and its support.

Fig. 4 is a view similar to Fig. 3 through the upper portion of the scale tube and its support, clearly illustrating the means for disengaging the striker from the magnetized rod at a fixed and uniform height of the tube.

Fig. 5 is a sectional top plan view on line 5—5 of Fig. 1 of the supporting base and anvil.

Referring to the drawing, $a$ designates a base integral with which is an anvil $a'$ designed in some instances to support a specimen to be tested. The supporting feet of this base comprise a small lug $k$ on the lower side of the anvil $a'$ and a pair of adjusting screws $l$ passing through the rear portion of the base.

Rigidly mounted in the base $a$ is a post $b$ on which in turn is mounted and adjustably supported by a collar $m$ a swinging and hinged bracket comprising the link $c$ slidably hinged on the post $b$, and the link $d$ in turn articulated by a pivotal hinge rod $n$ to the link $c$. In the forward edge of the bracket link $d$ is slidably mounted a rod $o$ that forms part of a metal frame $p$, which latter serves as a holder for a glass tube $e$, this latter being secured to the frame $p$ by upper and lower clamp collars $q$ and $r$, respectively. To the lower end of the frame $p$ is attached a stop block $i$ formed with an opening $s$ that is co-axial with the tube $e$. On the upper end of the frame $p$ is mounted an internally threaded collar $t$ which serves as a holder for a scraper $h$, this latter, as clearly shown in Fig. 4, preferably having a tapered lower end projecting into the upper end of the tube $e$, and formed with an axial bore $u$ that is axially coincident with the tube $e$. Slidably mounted in the bore $u$ of the scraper $h$ is a magnetized rod $g$ preferably equipped at its upper end with a knob or handle $v$. Within the tube $e$ is housed a steel ball $f$ of accurate spherical shape, and marked on or attached to the tube $e$ is a graduated scale $w$.

The tube frame $p$ also supports a vertical rod $k'$ which swings freely from a universal joint $x$ at its upper end, and thereby indicates when the tube frame and parts carried thereby are adjusted to vertical position, which is readily effected by manipulation of the adjusting screws $l$ of the base.

In operating the instrument, the material to be tested, if not too large, may be placed on the anvil $a'$, and the tube frame is then lowered directly onto the test specimen, the stop block $i$ coming into contact with the latter. The tube frame having then been accurately adjusted, if necessary, to vertical position, the rod $g$ is lowered onto the ball $f$ which lies in the opening $s$ of the stop block $i$; it being noted that the diameters of the openings $s$ and $h$ are slightly less than the diameter of the ball so that the latter cannot escape. The ball $f$ adheres to the lower end of the magnetized rod $g$, and the latter is raised until the ball is detached from the rod by the lower end of the scraper $h$. The ball instantly drops in a vertical line the full length of the tube and impinges on the surface of the test material, and the extent of its rebound is observed and visually measured by the operator on the scale $w$. The ball drops on a smooth, level surface of the test specimen, and some deformation takes place in both ball and specimen, and as soon as the shock of the impact has been spent each starts to correct the deformation, thereby causing the ball to rebound to a height depending on the character, and particularly the quality, of resilience of the materials used for the ball and the test specimen. By the use of a common steel test ball comparisons can be accurately made of the quality and conditions of temper of practically any and all solid substances.

The friction of the moving ball in the air and a certain loss within the steel ball are constant factors, so that comparative indications are entirely dependent on the materials being tested. The tube surrounding the ball is large enough to prevent any piston action from interfering with the free movement of the ball, and care is used by accurate vertical adjustment to prevent actual contact and friction loss between the ball and the tube while the test is being made. The delicacy and high efficiency of the instrument and of the method of testing which it embodies are shown by the fact that the ball will easily rebound over 90 per cent. of the height of fall on quenched high-carbon steel, while on other materials which do not have the capacity to correct deformation, or at least the capacity to make such correction promptly, the rebound is much less, as, for instance, lead will produce a rebound of only about 4 per cent.

The round shape of the test ball causes the area of contact between it and the specimen to increase rapidly as deformation increases, and thereby prevents any great penetration of the test piece with consequent reduction of the rebound. In other words, this device is designed and adapted to secure as large indications as possible for the height of drop, which assures accurate readings. In this respect my invention is sharply distinguished from many devices of this general character wherein the striker, instead of being spherical, has a more or less pointed or sharp lower end which effects a much greater penetration of the test materials, and thereby reduces (and in the case of soft materials sometimes entirely prevents) the rebound of the striker.

The spherical shape of the test ball also presents a large wearing surface, since it may strike on any side, and thus secures longevity and durability even when working on tempered steel.

The test specimen, if small, can be placed on the anvil $a'$, or, if large, it can be tested without the use of the anvil in an obvious manner. If the shape of the specimen is irregular, it may be supported in a vise.

It is believed that the principle, structural features, manner of use and advantages of the present invention will be manifest to those skilled in the art without further description or elaboration. Obviously, so far as the instrument itself is concerned, the details of structure may be considerably varied from those shown, while the method of testing by observing the height of rebound of a steel ball dropped vertically at uniform distances on test materials can be carried out by a wide variety of means. Hence, I do not limit the invention to the particular embodiment herein selected for purposes of illustration, but reserve all such variations and modifications as fairly fall within the spirit and purview of the claims.

I claim:—

1. In a testing device, the combination of a steel ball, a magnet for raising said ball above a test sample, means for detaching said ball from said magnet at a predetermined height, and means for measuring the height of rebound of said ball.

2. In a testing device, the combination of a tube having an open lower end adapted to overlie a test sample, a steel ball in said tube of less diameter than the latter, a magnetized rod, a guide in which said rod is slidably mounted, said guide also serving as a scraper to detach said ball from said rod, and means for measuring the height of rebound of said ball.

3. In a testing device, the combination of a tube having an open lower end adapted to overlie a test sample, a steel ball in said tube of less diameter than the latter, a magnetized rod, a guide at the upper end of said tube in which said rod is slidably mounted, said guide also serving as a scraper to detach said ball from said rod, a scale for measuring the height of rebound of said ball, and means for supporting said tube with capacity for vertical adjustment.

4. In a testing device, the combination of a tube having an open lower end adapted to overlie a test sample, a steel ball in said tube of less diameter than the latter, a magnetized rod, a guide at the upper end of said tube in which said rod is slidably mounted, said guide also serving as a scraper to detach said ball from said rod, a scale for measuring the height of rebound of said ball, and means for supporting said tube with capacity for both vertical and lateral adjustment.

5. In a testing device, the combination of a tube having an open lower end adapted to overlie a test sample, a steel ball in said tube of less diameter than the latter, a magnetized rod, a guide at the upper end of said tube in which said rod is slidably mounted, said guide also serving as a scraper to detach said ball from said rod, a scale for measuring the height of rebound of said ball, a carrier for said tube, means for adjusting said carrier to secure a vertical position of said tube, and means on said carrier for indicating a vertical position of said tube.

RALPH M. GASTON.